Dec. 13, 1927.
L. E. LA BRIE
1,652,485
BRAKE SHOE
Filed Nov 29, 1926
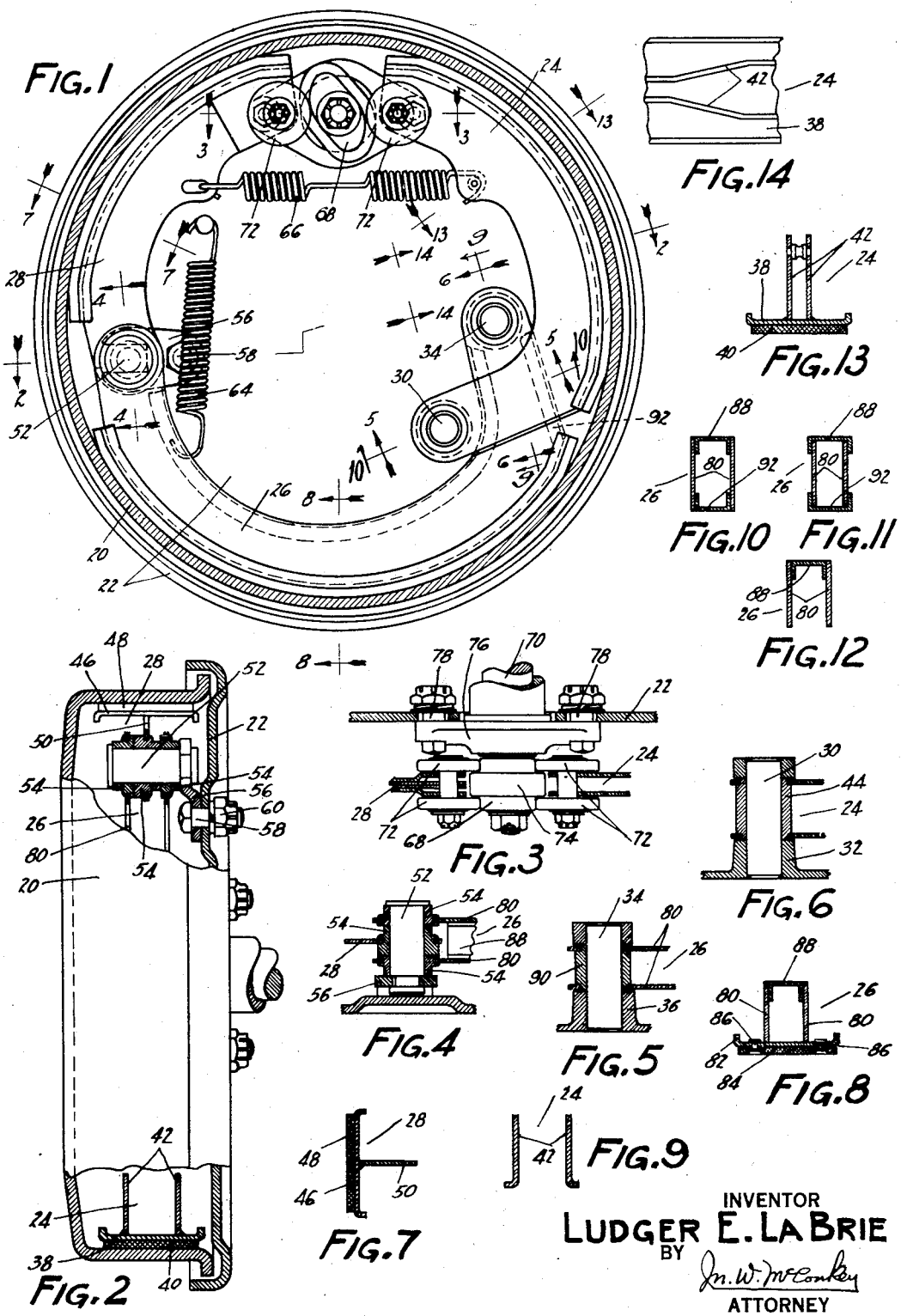
INVENTOR
LUDGER E. LaBRIE
BY
Jn. W. McConkey
ATTORNEY Patented Dec. 13, 1927.

1,652,485

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE SHOE.

Application filed November 29, 1926. Serial No. 151,376.

This invention relates to brakes and is illustrated as embodied in an internal expanding brake for a motor truck or other very heavy vehicle. An object of the invention is to provide a light and inexpensive shoe of great strength for use in a brake of this general character, preferably by building it up of a number of separate parts fastened together in a novel manner such that the various parts fully cooperate with each other in securing maximum strength in the finished shoe.

In one desirable arrangement, the shoe is stiffened by two members which are spaced a considerable distance apart and which are reinforced by a separate part such as an arcuate band welded or otherwise secured to their inner edges so that a trussed effect is secured. I prefer to build the shoes up by forming the stiffening members as separate stampings welded or otherwise secured at their outer edges to an arcuate band which carries the brake lining.

Various features of novelty relate to the provision of a separate member for additionally reinforcing the anchored end of the shoe, to an arrangement of the stiffening members to form pivot arms at the ends of the shoe, to a novel and desirable particular construction of the reinforcing member which connects the inner edges of the stiffening members, and to other desirable particular constructions which will be apparent from the following description of one illustrative embodiment shown in the accompanying drawing, in which:

Figure 1 is a vertical section through a brake embodying the above-described novel shoe, and showing this shoe and the other shoes of the brake in side elevation;

Figure 2 is a top plan view of the brake, partly broken away on the section 2—2 of Figure 1 to show part of the means for adjusting the brake;

Figure 3 is a partial section on the line 3—3 of Figure 1 and showing the brake-applying means;

Figure 4 is a partial section on the line 4—4 of Figure 1 showing the means for connecting two of the shoes;

Figures 5 and 6 are respectively sections on the lines 5—5 and 6—6 through the two anchors of the brake;

Figure 7 is a section through one of the end shoes on the line 7—7 of Figure 1;

Figure 8 is a section through the center shoe forming the subject-matter of the present application, on the line 8—8 of Figure 1;

Figure 9 is a partial section through one of the end shoes substantially on the line 9—9 of Figure 1;

Figure 10 is a section through the central shoe substantially on the line 10—10 of Figure 1;

Figures 11 and 12 are respectively sections corresponding to Figure 10 but showing modified constructions;

Figure 13 is a section through one of the end shoes on the line 13—13 of Figure 1; and Figure 14 is a partial inside elevation of the end shoe shown in section in Figure 13 and looking in the direction of arrows 14—14 in Figure 1.

The brake selected for illustration includes a rotatable drum 20 at the open side of which there may be arranged a backing plate or other suitable support 22 and within which are arranged the friction means of the brake illustrated in the drawing as including three arcuate and substantially rigid brake shoes 24, 26, and 28. Shoe 24 is anchored on a pivot 30 carried by a bracket or support 32 (Figure 6) secured in any suitable manner to the backing plate 22, while shoe 26 is anchored on a pivot 34 carried by a similar bracket 36 secured to the backing plate. Shoe 24 is built up of an outer arcuate band 38 to which the lining 40 is riveted or otherwise secured, and to which two stiffening members 42 are welded or otherwise secured along their outer edges as shown in Figure 13. The members 42 project beyond the lower end of the shoe 24 to straddle the anchored end of the shoe 26 and are connected at their anchored end by a bushing 44 mounted on the pivot 30.

Shoe 28 is generally T-shaped in cross-section and is built up of an outer arcuate band 46 carrying the brake lining 48 and a single stiffening member 50 welded or otherwise secured to the inner face of the band 46 along its outer edge. Shoe 28 is connected to the unanchored end of the shoe 26 by a floating pivot shown in Figures 2 and 4 and including a pivot pin 52 passing through bushings 54 carried by the adjacent ends of the shoes and having at the end nearest the backing plate 22 a groove embraced by the forked end of the automatically adjusted positioning member 56 pivoted on a bolt 58 and frictionally clamped against the backing plate 22 by a nut 60 on the bolt. The slot between the arms forming the forked end of the member 56 is greater than the diameter of the grooved portion of pin 52 by an amount equal to the desired brake-releasing movement of the pin 52. Thus when the brake is applied, the pin 52 will engage the one arm of member 56, and if necessary shift it against the frictional resistance at its inner end, while when the brake is released a return spring 64 will move the shoe 26 away from the brake drum until the pin 52 engages the opposite arm of member 56. Thus the shoe 26 is at all times given a predetermined clearance with respect to the brake drum when the brake is released.

The brake is applied against the resistance of a main return spring 66 by means shown as a double cam 68 on a suitable shaft 70 and engaging rollers 72 pivotally mounted on the opposite sides of the ends of shoes 24 and 28. The cam 68 may be provided with a central rib 74 projecting between the pairs of rollers 72 to position the ends of shoes 24 and 28 laterally. The shaft 70 may be journalled in a bracket 76 secured to the backing plate 22 by bolts 78 passing through relatively large openings in the backing plate so that the bracket with the cam and its shaft may shift when the brake is applied to center the cam with respect to the shoes.

The present invention relates to the manner of constructing a brake shoe such as shoe 26 to give it great strength without increasing its weight and while at the same time making it in a form suitable for accurate and inexpensive manufacture. Preferably the shoe is built up of two separate stiffening members 80, which may be stampings, and to the outer edges of which is welded or otherwise secured an arcuate band 82 to which the lining 84 is secured by fastenings such as rivets 86 arranged on opposite sides of the stiffening members 80. An important feature of novelty relates to connecting the members 80 preferably at their inner edges, by a separate reinforcing member 88, shown as being of arcuate form and channel-shaped in cross-section, with its side flanges engaging and welded or otherwise secured to the members 80. In the arrangement of Figures 8, 10, and 12, the member 88 is arranged entirely between the members 80 with its side flanges engaging their inner faces and with its bottom substantially flush with the inner edges of the stiffening members. As shown in Figure 11, the reinforcing member 88 may if desired be arranged with its side flanges engaging the outside faces of the stiffening members 80.

The stiffening members 80 project beyond the band 82 at both ends of the shoe, and at the left end of the shoe are provided with two of the bushings 54 which are sleeved on the pivot 52. At this end of the shoe the stiffening members also project some distance beyond the reinforcing member 88. At the right-hand end of the shoe the reinforcing member 88 extends nearly to the ends of the stiffening members 80 but terminates just short of their ends and at their extreme ends the members 80 are connected by a bushing 90 sleeved on the anchor or pivot 34 as shown in Figure 5. I prefer additionally to reinforce the anchored end of shoe 26 by a separate channel-shaped reinforcing member 92, preferably a separate stamping, which is arranged with its side flanges welded or otherwise secured to the stiffening members 80 from the end of the band 82 nearly to the pivot 34, as shown in Figure 1. As shown in Figure 11 the side flanges of the member 92 may engage the outer faces of the stiffening members 80 the same as in the case of the reinforcing member 88.

As shown in Figure 1, the reinforcing member 88 may be formed with an opening near the unanchored end of the shoe into which is hooked one end of the spring 64 which returns the shoe to idle position when the brake is released.

While one illustrative embodiment has been described in detail, it is not my intention to limit the scope of the invention to that particular embodiment or otherwise than by the terms of the appended claims.

I claim:

1. A brake shoe comprising an arcuate part having spaced stiffening flanges, in combination with a separate reinforcing member generally paralleling said arcuate part and secured to said flanges opposite the arcuate part.

2. A brake shoe comprising an arcuate part having inwardly-extending spaced stiffening flanges, in combination with a separate generally-arcuate reinforcing member secured to said flanges opposite the arcuate part.

3. A brake shoe comprising, in combination, a pair of generally-parallel spaced stiffening members, a separate arcuate lining-carrying band secured to the outer edges of said members, and a separate reinforcing band secured to the inner edges of said members.

4. A brake shoe comprising, in combination, a pair of generally-parallel spaced stiffening members, a separate arcuate lining-carrying band welded to the outer edges of said members, and a separate reinforcing band welded to the inner edges of said members.

5. A brake shoe comprising, in combination, an arcuate part, spaced stiffening members projecting inwardly from said part and spaced inwardly from its side edges, brake lining engaging the outer face of said part, fastenings passing through said part and the lining on opposite sides of the space defined by the stiffening members, and reinforcing means connecting the stiffening members inwardly from said part.

6. A brake shoe comprising, in combination, an arcuate part, spaced stiffening members projecting inwardly from said part and spaced inwardly from its side edges, brake lining engaging the outer face of said part, fastenings passing through said part and the lining on opposite sides of the space defined by the stiffening members, and a reinforcing band connecting the inner edges of the stiffening members.

7. A brake shoe comprising an arcuate part with spaced stiffening flanges, in combination with an arcuate channel-section reinforcing member having side flanges secured to said stiffening flanges.

8. A brake shoe comprising an arcuate part with spaced stiffening flanges, in combination with an arcuate channel-section reinforcing member having side flanges secured to the portions of said stiffening flanges adjacent their inner edges.

9. A brake shoe comprising an arcuate part with spaced stiffening flanges, in combination with an arcuate channel-section reinforcing member between the stiffening flanges having side flanges secured respectively to said stiffening flanges.

10. A brake shoe comprising an arcuate part with spaced stiffening flanges, in combination with an arcuate channel-section reinforcing member between the stiffening flanges having side flanges secured respectively to said stiffening flanges and with its bottom substantially flush with the inner edges of said stiffening flanges.

11. A brake shoe comprising an arcuate band, a pair of stiffening members secured to said band and projecting beyond one end of said band as spaced pivot arms, and a separate channel-section stamping secured between said arms and forming a reinforcement connecting the same edges of said members as the band.

12. A brake shoe comprising an arcuate band, a pair of stiffening members secured to said band and projecting beyond one end of said band as spaced pivot arms, a separate stamping secured between said arms and forming a reinforcement connecting the same edges of said members as the band, and an arcuate reinforcing member connecting the edges of said stiffening members opposite said band and extending for substantially the same length as the band and stamping together.

13. A brake shoe comprising, in combination, spaced stiffening members, and a pair of arcuate bands secured respectively to the inner and outer portions of the stiffening members, the stiffening members projecting beyond the outer band at both ends of the shoe to form spaced pivot arms.

14. A brake shoe comprising, in combination, spaced stiffening members, and a pair of arcuate bands secured respectively to the inner and outer portions of the stiffening members, the stiffening members projecting beyond the outer band at both ends of the shoe to form spaced pivot arms and the inner band extending beyond the outer band at both ends of the shoe.

In testimony whereof, I have hereunto signed my name.

LUDGER E. LA BRIE.